United States Patent
Zhang et al.

(10) Patent No.: US 10,273,338 B2
(45) Date of Patent: Apr. 30, 2019

(54) ION EXCHANGE MEMBRANES PREPARED FROM CROSSLINKED ION EXCHANGE POLYMER COMPOSITIONS

(71) Applicant: BL Technologies, Inc., Minnetonka, MN (US)

(72) Inventors: Kai Zhang, Singapore (SG); John H. Barber, Guelph (CA); Russell James MacDonald, Burlington, MA (US); Yongchang Zheng, Westborough, MA (US); Li May Goh, Singapore (SG); Yan Gao, St-Romuald (CA); Yonghong Zhao, Singapore (SG)

(73) Assignee: BL Technologies, Inc., Minnetonka, MN (US)

( * ) Notice: Subject to any disclaimer, the term of this patent is extended or adjusted under 35 U.S.C. 154(b) by 9 days.

(21) Appl. No.: 15/537,560

(22) PCT Filed: Dec. 19, 2014

(86) PCT No.: PCT/US2014/071568
§ 371 (c)(1),
(2) Date: Jun. 19, 2017

(87) PCT Pub. No.: WO2016/099555
PCT Pub. Date: Jun. 23, 2016

(65) Prior Publication Data
US 2017/0355827 A1 Dec. 14, 2017

(51) Int. Cl.
*C08J 5/22* (2006.01)
*C08J 5/20* (2006.01)
*B01J 41/13* (2017.01)
*B01D 69/12* (2006.01)

(52) U.S. Cl.
CPC .......... *C08J 5/2218* (2013.01); *B01D 69/125* (2013.01); *B01J 41/13* (2017.01); *C08J 5/20* (2013.01); *B01D 2323/30* (2013.01); *C08J 2329/02* (2013.01); *C08J 2333/00* (2013.01); *C08J 2333/24* (2013.01)

(58) Field of Classification Search
CPC ........ C08J 5/2218; C08J 5/20; C08J 2329/02; C08J 2333/00; C08J 2333/24; B01J 41/13; B01D 69/125; B01D 2323/30
USPC .......................................... 521/27
See application file for complete search history.

(56) References Cited

U.S. PATENT DOCUMENTS

| | | | |
|---|---|---|---|
| 7,968,663 B2 * | 6/2011 | MacDonald | B01J 41/14 526/304 |
| 9,073,050 B2 * | 7/2015 | MacDonald | C08J 5/2231 |
| 2009/0156699 A1 * | 6/2009 | MacDonald | B01J 41/14 521/25 |
| 2013/0090396 A1 * | 4/2013 | MacDonald | C08J 5/2231 521/27 |

* cited by examiner

Primary Examiner — Michael Bernshteyn

(57) ABSTRACT

A self-supported ion exchange membrane including a polymerized and crosslinked monomer, where the monomer includes: a least one ionic group, a polymerized group, and a silicate group; and a polymer chemically bonded to crosslinked monomer through the silicate group.

18 Claims, No Drawings

ION EXCHANGE MEMBRANES PREPARED FROM CROSSLINKED ION EXCHANGE POLYMER COMPOSITIONS

FIELD OF THE INVENTION

The present disclosure relates to ion exchange membranes prepared from crosslinked ion exchange polymer compositions.

BACKGROUND

The following paragraphs are not an admission that anything discussed in them is prior art or part of the knowledge of persons skilled in the art.

Ion exchange materials are commonly employed to treat and remove ionizable components from fluids for a variety of applications. Flow-through beds or flow-through devices for fluid treatment may employ exchange material or components in the form of grains, fabrics or membranes. The ion exchange functionality operates to transport one type of ion across the material in an electric field, while substantially or effectively blocking most ions of the opposite polarity. Anion exchange polymers and materials carry cationic groups, which repel cations and are selective to anions. Cation exchange polymers and materials carry anionic groups, which repel anions and are selective to cations.

Ion exchange membranes may be prepared by polymerization of an ionic monomer, containing a cationic group for anion exchange membranes or an anionic group for cation exchange membranes, along with a crosslinking co-monomer in the presence of a backing of a stable reinforcing fabric, such as polypropylene, polyester, polyvinyl chloride, or polyethylene. The minimum thickness of the resulting ion exchange membrane is constricted by the fabric, whose thickness may be from 0.5-0.7 mm. Fabrics may be pre-treated with different chemicals to improve the wettability and compatibility with ion-exchange materials.

SUMMARY OF THE INVENTION

The following introduction is intended to introduce the reader to this specification but not to define any invention. One or more inventions may reside in a combination or sub-combination of the apparatus elements or method steps described below or in other parts of this document. The inventors do not waive or disclaim their rights to any invention or inventions disclosed in this specification merely by not describing such other invention or inventions in the claims.

There are disadvantages associated with ion exchange membranes prepared with a stable backing fabric. For example, energy consumption in electro-separation systems and technologies, such as electrodialysis reversal (EDR), electrodialysis (ED), and electrodeionization (EDI), is largely dependent on the resistance of the ion-exchange membranes therein, and about half of the membrane resistance is due to the reinforcing fabric in the membrane since the fabric is inactive and an insulator. In another example, pre-treatment of the fabric may introduce contaminants into membrane.

It would be desirable to prepare a self-supported homogeneous ion exchange membrane, that is, an ion exchange membrane that does not require a backing fabric. Since self-supported homogeneous ion exchange membranes do not include a backing fabric, the thickness of the self-supported membrane may be reduced in comparison to the thickness of ion exchange membranes that include a backing fabric (supported membranes). The reduced thickness may reduce the membrane resistance and, accordingly, may reduce the energy consumption of electro-separation stacks that include self-supported membranes. Reducing the thickness of the membrane may also result in raw materials cost saving. Eliminating backing fabrics eliminates contaminants, which may simplify membrane post treatment processes.

In some examples of self-supported homogeneous ion exchange membranes according to the current disclosure, the thickness of the membrane may be 20-30% of the thickness of supported ion exchange membranes. The resistance of self-supported membrane may be less than 50% of the resistance of supported ion exchange membranes. The raw materials cost may be as little as 32% of the raw material cost for the production of supported ion exchange membranes.

Self-supported ion exchange membranes according to the present disclosure include polymer-silicate composites instead of a backing fabric. Self-supported ion exchange membrane according to the present disclosure may be formed from the polymerization of a crosslinking monomer that has a silicate forming functional group, and reaction of the resulting crosslinked polymer with a reactive polymer that has a functional group capable of reacting with the silicate forming functional group.

In another aspect, the present disclosure provides a polymer that may be used in a self-supported ion exchange membrane. The polymer includes a polymerized and crosslinked monomer, where the monomer includes: a least one cationic group, a polymerized group, and a silicate group. The polymer further includes a polymer chemically bonded to the polymerized and crosslinked monomer via the silicate group.

DETAILED DESCRIPTION

The singular forms "a", "an", and "the" include plural referents unless the context clearly dictates otherwise. The endpoints of all ranges reciting the same characteristic are independently combinable and inclusive of the recited endpoint. All references are incorporated herein by reference.

The modifier "about" used in connection with a quantity is inclusive of the stated value and has the meaning dictated by the context (e.g., includes the tolerance ranges associated with measurement of the particular quantity).

"Optional" or "optionally" means that the subsequently described event or circumstance may or may not occur, or that the subsequently identified material may or may not be present, and that the description includes instances where the event or circumstance occurs or where the material is present, and instances where the event or circumstance does not occur or the material is not present.

Throughout the disclosure, the term "hydrocarbon" represents hydrocarbon groups containing from 1-20 carbon atoms. In the context of the disclosure, it would be understood that reference to a "hydrocarbon" refers to a hydrocarbon radical that is chemically bonded to the compound of reference. Hydrocarbons according to the present disclosure may further comprise one or more heteroatoms, such as oxygen, nitrogen, and sulfur.

"Aliphatic" hydrocarbons may be straight or branched. Examples of aliphatic hydrocarbons include methyl, ethyl, n-propyl, isopropyl, n-butyl, tert-butyl, isooctyl, benzyl, cyclohexylmethyl, phenethyl, alpha,alpha-dimethylbenzyl, 3-hydroxypropyl, and the like.

As defined herein, the term "aromatic" hydrocarbons or group refers to a cyclic array of sp2 hybridized carbon atoms and conjugated carbon-carbon double bonds, and is attached via an sp2 hybridized carbon atom. The aromatic group or radical can have from one to the maximum permissible number of substituents. Substituents are generally defined as radicals other than a hydrogen atom. Thus an aromatic carbon atom that is not explicitly substituted by a substituent is presumed substituted by a hydrogen atom. The aromatic radical or group can further comprise heteroatoms, such as sulfur, oxygen, and nitrogen. Examples of aryl groups include phenyl, substituted phenyl, tolyl, substituted tolyl, xylyl, mesityl, chlorophenyl, naphthyl, furyl, furylmethyl, thienyl, pyrrolyl, and the like.

As defined herein, the term "cycloaliphatic" hydrocarbon or group refers to a monovalent cyclic array of carbon atoms, and is attached to the silicon atom via an sp3 hybridized carbon atom that forms part of the cyclic array of carbon atoms. The cyclic array of carbon atoms may further comprise one or more heteroatoms, such as oxygen, sulfur, and nitrogen. Further, the cyclic array of carbon atoms can be substituted with one to the maximum permissible number of substituents. Examples of cycloalkyl groups include cyclohexyl, methylcyclohexyl, trimethylcyclohexyl, phenylcyclohexyl, tetrahydropyranyl, 4-thiacyclohexyl, cyclooctyl, and the like.

The term "alkoxy", "cycloalkoxy", or "aryloxy" refers to the monovalent radical resulting from bonding of the corresponding aliphatic hydrocarbon, cycloaliphatic hydrocarbon, or aromatic hydrocarbon with an oxygen atom, respectively. The term "hydrocarbonyloxy" refers to the monovalent radical resulting from bonding of a monovalent hydrocarbon with an oxygen atom.

Discussion.

Generally, the present disclosure provides a polymer that may be used in a self-supported ion exchange membrane, a self-supported ion exchange membrane, a method of making the polymer, and a method of making such a membrane.

In one example, the present disclosure provides a polymer that is formed from the polymerization of a crosslinking monomer, and reaction of the resulting crosslinked polymer with a reactive polymer.

In another example, the present disclosure provides a self-supported ion exchange membrane that is formed from the polymerization of a crosslinking monomer, and reaction of the resulting crosslinked polymer with a reactive polymer.

The crosslinking monomer includes: at least one cationic group; a polymerizable group; and a silicate forming group.

The cationic group may be any functional group commonly used in ion exchange membranes or resins. The cationic group may be uncharged before or during formation of the self-supported membrane, and may be reacted in a subsequent step after the membrane has been formed to reveal a charge. The cationic group may be, for example, a quaternary ammonium group.

The polymerizable group may be an alkenyl group, such as a vinyl group or an acrylic-based group. The vinyl group may be, for example, a styrene group or a styrene group substituted with a hydrocarbon group. The acrylic-based group may be, for example, an acrylic group, or an acrylamide group. It is desirable to use an acrylamide group as the polymerizable group when making a membrane that will be exposed to a high pH environment.

The silicate forming group may be a trialkoxyalkylsilane, or an alkoxysilane such as a tri-alkoxysilane. Examples of a tri-alkoxysilane with may be used include: tri-methoxysilane, tri-ethoxysilane, and tri-propoxysilane.

The crosslinking monomer may have the general structure of formula (I):

where $W_1$ and $W_2$ are bridging groups, and X includes a cationic group. $W_1$ and $W_2$ may, independently, be a bond or may include, for example, an oxygen atom, an amine group, an amide group, a carbonyl group, or a hydrocarbon. The hydrocarbon may be, for example, a branched or unbranched alkyl group, a cycloalkyl group, an aromatic group, or any combination thereof. The amide group, the carbonyl group, the alkyl group, the cycloalkyl group, and the aromatic group may be unfunctionalized or functionalized with, for example, a hydrocarbon, one or more heteroatoms, or both. An oxygen functionalized alkyl group may be, for example, an alkyl ether or a poly alkyl ether. $R_1$ may be hydrogen, or a hydrocarbon such as: a phenyl group or an aliphatic group, for example a methyl group, a carboxylate group, or an amide group. $R_2$ may be an alkyl group, such as a methyl or an ethyl group. X may be, for example, a quaternary ammonium group, or a hydrocarbon functionalized with a quaternary ammonium group.

The reactive polymer includes a plurality of silicate reactive groups that are reactive with the silicate forming group of the crosslinking monomer. The silicate reactive group is an alcohol, for example a primary alkyl alcohol, a secondary alkyl alcohol, a tertiary alkyl alcohol, or an aromatic alcohol. The reactive polymer may be formed from the polymerization of a monomer that includes a second polymerizable group such as an alkenyl group, for example a vinyl group.

The reactive polymer may have the general structure of formula (II):

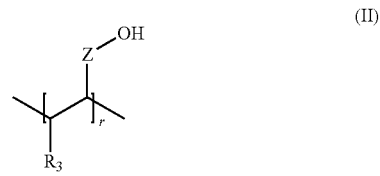

where $R_3$ may be hydrogen, or a hydrocarbon, for example an alkyl group such as a methyl group; where Z is a bridging group; and where r is an integer that corresponds to a polymer having a molecular weight from about 80,000 to about 200,000 Daltons. Polymers having molecular weights from about 80,000 to about 120,000 Daltons have reduced viscosity as compared to polymers having molecular weights from about 150,000 to about 200,000 Daltons. The reduced viscosity is desirable for ease in manipulating the polymer during manufacturing.

Z may be a bond or may include a hydrocarbon. The hydrocarbon may be, for example, a branched or unbranched alkyl group, a cycloalkyl group, an aromatic group, or any combination thereof. The alkyl group, the cycloalkyl group, and the aromatic group may be unfunctionalized or functionalized with, for example, a hydrocarbon, one or more heteroatoms, or both. The value of r may be, for example, from about 1800 to about 4500 when $R_3$ is hydrogen and Z is a bond.

In a specific example, the crosslinking monomer may be of formula (III):

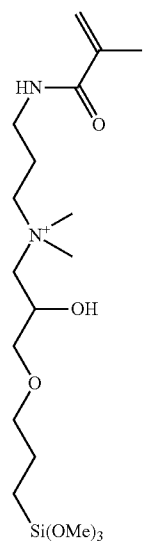

(III)

and the reactive polymer may be polyvinyl alcohol.

Polymerization of the crosslinking monomer may include polymerization with a non-crosslinking monomer. For example, the polymerization reaction may polymerize the monomer of formula (III) along with methacrylamide.

Polymerization of the crosslinking monomer, and reaction of the resulting crosslinked polymer with the reactive polymer, results in an ionic polymer that is bound to the reactive polymer through Si—O bonds. The resulting anion exchange membrane may have as, at least a portion of the membrane, a structure of formula (IV):

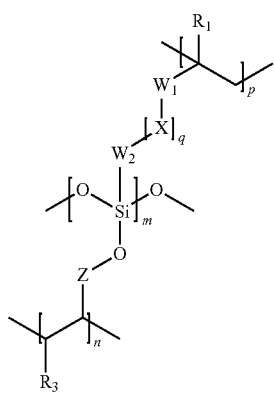

(IV)

where $W_1$, $W_2$, X, Z, $R_1$, and $R_3$, are as defined above.

The values for "m", "n", "p" and "q" may be determined based on the molar amounts of compounds used to form the crosslinked polymer.

The value of m may be determined based on the moles of silicate forming group used in the reaction.

The value of n may be determined based on the moles of monomer needed to generate the amount of reactive polymer used in the reaction.

The value of p may be determined based on the moles of polymerizable group used in the reaction. The moles of polymerizable group may, in some examples, correspond to the number of moles of crosslinking monomer. In other instances, for example when one co-monomer is polymerized with the crosslinking monomer, the moles of polymerizable group correspond to the molar sum of the two co-monomers.

The value of q may be determined based on the moles of cationic groups used in the reaction, or on the moles of compounds used in the reaction that react to form cationic groups. For example, the value of q may be determined based on the moles of tertiary amines used to react with an excess of epoxide, since the resulting quaternary amines provide the charge for the cationic group.

In the ratio of m:n:p:q, the value of m may be from about 0.1 to about 1.5, the value of p and q maybe from about 0.8 to about 1.2, and the value of n is, in an embodiment from about 2.3 to about 4 times the value of m. In view of the above, an anion exchange membrane having the structure of formula (IV) may have m:p:q in a ratio of 0.1-1.5:0.8-1.2: 0.8-1.2 and m:n in a ratio of 1:2.3-4.

In view of the above, it should be understood that, although the compound of formula (IV) suggests that each alcohol of the reactive polymer has reacted to form a silicate, that every silicate is polymerized with another silicate, and that every polymerizable group is polymerized, this is not necessary. Self-supporting membranes according to the present disclosure may include free alcohols on the reactive polymer, silicates that are not bound to the reactive polymer, polymerizable groups that have not reacted or reacted with only one other polymerizable group, and/or terminal silicates that are bound to no other, or to one other, silicate groups. Further, although the compound of formula (IV) suggests that the polymerized crosslinking monomers are bound to a plurality of silicate reactive groups from only a single reactive polymer, this is not necessary. Rather, the polymerized crosslinking monomers may be bound to silicate reactive groups from a plurality of reactive polymers.

Additionally, it should be understood that it is not necessary for two crosslinking monomers to be joined together in a head-to-head/tail-to-tail configuration. Rather, a crosslinking monomer may be joined with one crosslinking monomer at the polymerizable group, and joined with a different crosslinking monomer at the silicate forming group.

The crosslinking monomer may be prepared by reacting, in the presence of an acid, a compound that includes an epoxide and the silicate forming group, with a compound that includes a tertiary amine and the polymerizable group.

The compound that includes a tertiary amine and the polymerizable group may be an ethylenic tertiary amine with an acrylic group. Examples of an ethylenic tertiary amine an acrylic group include dimethylaminopropylmethacrylamide (DMAPMA), dimethylaminopropylacrylamide (DMAPAA), diethylaminopropylmethacrylamide (DEAPMA), or dimethylaminoethylmethacrylate (DMAEMA).

The compound that includes an epoxide and the silicate forming group may be, for example, a glycidyl alkyl trimethoxysilate, a glycidyl ether trimethoxysilane, a poly ethylene glycol glycidyl ether trimethoxysilane, a glycidyloxyalkyl trimethoxysilane. In a particular example, the compound that includes an epoxide and the silicate forming group may be (3-Glycidyloxypropyl)trimethoxysilane (GPTMSi).

The acid may be any type of acid, such as a mineral acid. In one example, the acid includes, but is not limited to, hydrochloric acid, methane sulfonic acid, sulfuric acid or phosphoric acid. In one example, the acid is present in an amount of from about 75 percent by mole weight to about 125 percent by mole weight, based on the mole weight of the tertiary amine. In another example, the acid is present in an amount of from about 75 percent by mole weight to about 100 percent by mole weight, based on the mole weight of the tertiary amine.

The reaction to prepare the crosslinking monomer may additionally include a compound that reacts with two or more tertiary amines. This compound reacts with the tertiary amines to form additional crosslinking in the final polymer, which are independent of the silane-based crosslinking. One example of such a compound is a di-epoxide, for example 1,4-cyclohexanedimethanol diglycidyl ether (CHDMDGE).

As noted above, in one specific example the crosslinking monomer is of formula (III). The crosslinking monomer of formula (III) may be prepared by the reaction of a compound of formula (V) with a compound of formula (VI):

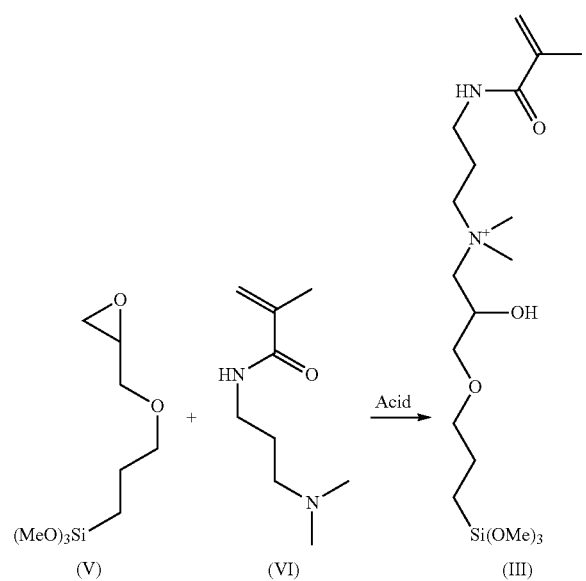

In an example where the reactive polymer is polyvinyl alcohol, the alcohol groups correspond to silicate reactive groups, which react with the silicate forming groups to form a silicate.

In a specific example, where the crosslinking monomer is a compound of formula (III) and the reactive polymer is polyvinyl alcohol, the resulting polymerized and crosslinked anion exchange membrane may have as, at least a portion of the membrane, a structure of formula (VII):

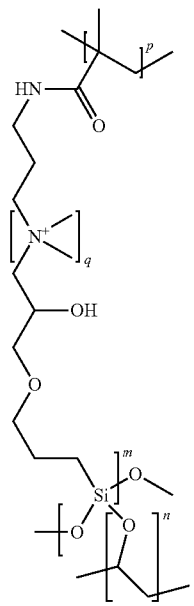

The compound of formula (VII) corresponds to the compound of formula (IV) where: $R_1$ is methyl, $W_1$ is an alkyl functionalized amide group; X is a dimethyl quaternary ammonium group; $W_2$ is an alcohol-functionalized ether; Z is a bond; and $R_3$ is H.

Polymerization of the crosslinking monomer to form the polymer may occur simultaneously with the reaction between the silicate forming groups and the silicate reactive groups on the reactive polymer. For example, the tertiary amine and the epoxide are reacted together in the presence of an acid to first produce the crosslinking monomer. The resulting crosslinking monomer is mixed with a radical initiator and the reactive polymer. The resulting mixture is cast on a substrate. Thermal promoted radical polymerization is initiated by heating to a suitable temperature and for a time sufficient to convert the crosslinking monomers into polymers, and to hydrolyze the silane groups to generate silicates crosslinked to the silicate reactive groups on the reactive polymer.

The crosslinking monomer may be reacted with the reactive polymer in a ratio of about 1:2.3 to about 1:4 silicate forming groups:silicate reactive groups. In an embodiment, it is preferable that the ratio be about 1:2.4 to about 1:3.5 since ratios equal to or less than 1:2.1 and ratios equal to or greater than 1:4.5 result in membranes that are undesirably brittle for some applications. For example, a polymer formed from the reaction of 0.035 mol DMAPMA, 0.035 mol methane sulfonic acid, 0.035 mol of GPTMSi, and 21% (w/w) of PVA in the membrane resulted in a non-brittle membrane. This polymer is formed from the reaction of silicate forming groups:silicate reactive groups in a ratio of 1:2.45. However, a polymer formed from the reaction of 0.05 mol DMAPMA, 0.05 mol methane sulfonic acid, 0.05 mol of GPTMSi, and 19% (w/w) of PVA in the membrane resulted in a membrane that was undesirably brittle for formation of an ion-exchange membrane. This polymer is formed from the reaction of silicate forming groups:silicate reactive groups in a ratio of 1:1.98.

The temperature range may be from about 60° C. to about 150° C. In particular examples, the temperature range is from about 70° C. to about 140° C. In other examples, the temperature range is from about 85° C. to about 120° C. It should be understood that the reaction temperature should be below the boiling points of all of the materials.

The reaction time may be from about 1 minute to about 4 hours. In particular examples, the reaction time is from about 10 minutes to about 3 hour. In other examples, the reaction time is from about 1 hour to about 2 hours. Longer reaction times may be beneficial when the reaction is performed at lower temperatures in order to increase the extent of polymerization.

The crosslinking monomer and reactive polymer may be cast on the substrate, such as a glass substrate, at a desired thickness. The thickness may be from about 0.05 to 0.7 mm. In particular examples, the thickness is from 0.1 to 0.3 mm.

When the ion exchange membrane includes a quarternary ammonium group formed from the reaction of a tertiary amine and an epoxide, the quaternization of the tertiary amine is conducted in the presence of an acid, which reduces the self-polymerization of the epoxide by quenching the self-polymerization reaction. The amount of quenching is controlled by the amount of acid used in the reaction. The acid may be any type of acid. In one embodiment, the acid is a mineral acid. In another embodiment, the acid includes, but is not limited to, hydrochloric acid, methane sulfonic acid, sulfuric acid or phosphoric acid. The acid is added in any amount suitable for quenching the self-polymerization of the epoxide. In one embodiment, the acid is present in an amount of from about 75 percent by mole weight to about 125 percent by mole weight, based on the mole weight of the tertiary amine. In another embodiment, the acid is present in an amount of from about 75 percent by mole weight to about 100 percent by mole weight, based on the mole weight of the tertiary amine.

The ion exchange polymer may be synthesized using a wide ratio range of the tertiary amine to the epoxide. In one embodiment, the ratio is from about 0.3 to about 1.5 moles of the tertiary amine to each equivalent mole of the epoxide. In another embodiment, the ratio is from about 0.5 to about 1.2 moles of the tertiary amine monomer per equivalent mole of the epoxide.

A catalyst is added to aid in polymerization. The catalysts may be spontaneously activated or activated by heat, electromagnetic radiation, electron beam radiation, ultraviolet light, or by chemical promoters. The catalyst may be added in any amount suitable for aiding in polymerization. In one embodiment, the catalyst is in an amount of from about 0.1 to about 5.0 percent by weight of the reaction mixture.

The catalyst may be any type of catalyst suitable for polymerizing the crosslinking monomer. It should be understood that, in an embodiment, it is preferable if the catalyst did not contain functional groups that prevented the formation of the crosslinking monomer, or the reaction between the crosslinking monomer and the reactive polymer. For example, when reacting compounds of formulas (V) and (VI) in the presence of polyvinyl alcohol, it is desirable that the catalyst not contain functional groups that react with epoxides or alkoxysilanes. A catalyst that did contain functional groups that prevented the formation of the crosslinking monomer, or the reaction between the crosslinking monomer and the reactive polymer would lower the yield of the reaction.

In one embodiment, the catalyst is a peroxide. The peroxide includes, but is not limited to, methyl ethyl ketone peroxide and dibenzoyl peroxide. In another embodiment, the catalyst is a water soluble or oil soluble azo initiator. The azo initiator includes, but is not limited to, 2,2'-azobis[2-(2-imidazolin-2-yl)propane]dihydrochloride, 2,2'-azobis(N,N'-dimethylene isobutyramidine)dihydrochloride, 2,2'-azobis(2-methylpropionamidine)dihydrochloride, 2,2'-azobis[N-(2-carboxyethyl)-2-methylpropionamidine]hydrate, 2,2'-azobis{2-[1-(2-hydroxyethyl)-2-imidazolin-2-yl)propane], 2,2'-azobis[2-methyl-N-(2-hydroxyethyl)propionamide] and dimethyl 2,2'-azobis(2-methylpropionate).

The term "chemical promoters" as used herein refers to a substance, which increases the rate of polymerization either by itself or in combination with another catalyst. For example, methyl ethyl ketone peroxide can function as a catalyst itself, but its rate of initiation can be greatly increase by small amounts of transition metal salt chemical promoters, such as, for example, cobalt naphthenate. Similarly, dibenzoyl peroxide can function as a catalyst itself, but its action be accelerated by a dimethylaniline chemical promoter. The UV radiation polymerization agents can become more efficient in the presence of chemical promoters, which are photoinitiators or chemical compounds that generate free radicals. Non-limiting examples of photoinitiating chemical promoters include benzophenone, benzyl, antraquinone, eosin and methylene blue.

The reaction to form the silicate is accomplished by heating the reagents, for example to a temperature of about 60° C. to about 150° C. In particular examples, the temperature is from about 70° C. to about 140° C. In other examples, the temperature is from about 85° C. to about 120° C. Accordingly, even if the catalyst or chemical promoter is not heat activated, it would be desirable to heat the reagents to the above noted temperatures.

In one embodiment, the components are combined in the presence of a solvent. Any solvent is suitable for use in this embodiment, so long as the solvent is not itself polymerizable and the components are soluble in it. Solvents suitable in this embodiment include, but are not limited to, water, propylene glycols, dipropylene glycols, dimethylsulfoxide, 2-pyrrolidone, N-methyl pyrrolidone and mixtures thereof.

The amount of solvent is added in any amount suitable for solubilizing the components. In one embodiment, the amount of solvent is from about 10 to about 90 percent by weight based on the total weight of the reaction mixture. In another embodiment, the amount of solvent is from about 20 to about 70 percent by weight based on the total weight of the reaction mixture. In another embodiment, the amount of solvent is from about 25 to about 50 percent by weight based on the total weight of the reaction mixture.

The crosslinking monomer may be combined with the reactive polymer in varying amounts in order to generate ion-exchange membranes with varying amounts of positive charge. For example, reactions where polyvinyl alcohol is 15-30% (w/w) of the final membrane result in membranes with IEC values of 1-2 meq/gram of dry membrane. The moisture content values may vary in the range of 30-60% of wet membrane.

In order that those skilled in the art will be better able to practice the present disclosure, the following examples are given by way of illustration and not by way of limitation.

Example 1

DMAPMA (6.8 g, 0.04 moles), methane sulfonic acid (MSA, 3.8 g, 0.04 moles), and water (30 g) were mixed together and stirred for 15 minutes. GPTMSi (9.4 g, 0.04 moles) was added and the solution was heated to 80° C. for 30 minutes. Polyvinyl alcohol (79 g of a 7% solution) was added to the mixture. The mixture was stirred and allowed to cool to room temperature.

VA-044 (0.2 g, 0.0006 mol), a water soluble azo initiator having the formula 2,2'-Azobis[2-(2-imidazolin-2-yl)propane]dihydrochloride, was added to the mixture, which was stirred for 15 minutes.

The resulting mixture was poured on a clean glass plate and casted using a doctor blade with a gap of 1 mm. The glass plate was heated in an oven and dried at 80° C. for 30 minutes. At this point, the casting and drying steps may be repeated one or more times to increase the thickness of the resulting crosslinked polymer membrane. The temperature of the oven was increased to 100° C. for 30 minutes, and then to 120° C. for another hour.

The glass plate was removed from the oven and allowed to cool to room temperature. The glass plate was immersed in a 1N sodium chloride solution overnight. The hydrated membrane was then peeled off of the glass plate.

The membrane had the following characteristics: Ion exchange capacity=1.48 meq/g; Water content=34%; Thickness=0.21 mm; Resistivity=3.5 Ohm-cm$^2$.

In the preceding description, for purposes of explanation, numerous details are set forth in order to provide a thorough understanding of the examples. However, it will be apparent to one skilled in the art that these specific details are not required. Accordingly, what has been described is merely illustrative of the application of the described examples and numerous modifications and variations are possible in light of the above teachings.

Since the above description provides exemplary examples, it will be appreciated that modifications and variations can be effected to the particular examples by those of skill in the art. Accordingly, the scope of the claims should not be limited by the particular examples set forth herein, but should be construed in a manner consistent with the specification as a whole.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims

What is claimed is:

1. A self-supported ion exchange membrane comprising:
    a polymerized and crosslinked monomer, wherein the monomer includes: a least one cationic group, a polymerized group, and a silicate group; and
    a polymer comprising an alcohol that is chemically bonded to the silicate group of the polymerized and crosslinked monomer.

2. The self-supported ion exchange membrane according to claim 1, wherein the polymerized group is the polymerization product of an alkenyl group.

3. The self-supported ion exchange membrane according to claim 1, wherein the silicate group is the reaction product of an alkoxysilane.

4. The self-supported ion exchange membrane according to claim 1, wherein the polymerized and crosslinked monomer is the reaction product from the polymerization of a compound of formula (I):

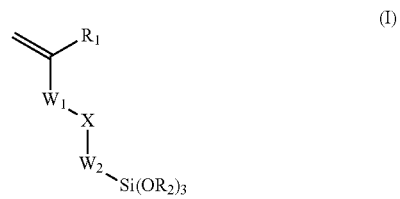

wherein:
    $W_1$ and $W_2$, independently, are a bond, or an oxygen atom, a functionalized amine group, an unfunctionalized amine group, a functionalized amide group, an unfunctionalized amide group, a carbonyl group, a functionalized hydrocarbon, an unfunctionalized hydrocarbon, or any combination thereof;
    X is a cationic group, or a hydrocarbon functionalized with a cationic group;
    $R_1$ is hydrogen, or a hydrocarbon; and
    $R_2$ is an alkyl group.

5. The self-supported ion exchange membrane according to claim 4, wherein the chemical bond between the polymer and the polymerized and crosslinked monomer is formed from the reaction between the alkoxysilane and an alcohol on the polymer.

6. The self-supported ion exchange membrane according to claim 5, wherein the polymer comprising an alcohol that is chemically bonded to the silicate group is the reaction product from the reaction between the alkoxysilane and a compound of formula (II):

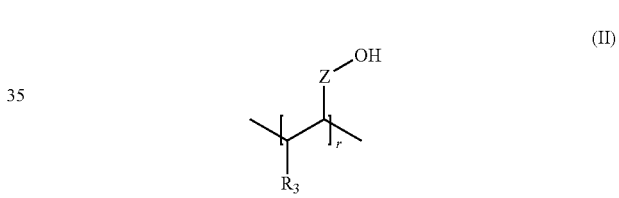

wherein:
    $R_3$ is hydrogen, or a hydrocarbon;
    Z is a bond or a hydrocarbon; and
    r is an integer from about 1800 to about 4500.

7. The self-supported ion exchange membrane according to claim 1, wherein the polymerized and crosslinked monomer chemically bonded to the polymer has a structure of formula (IV):

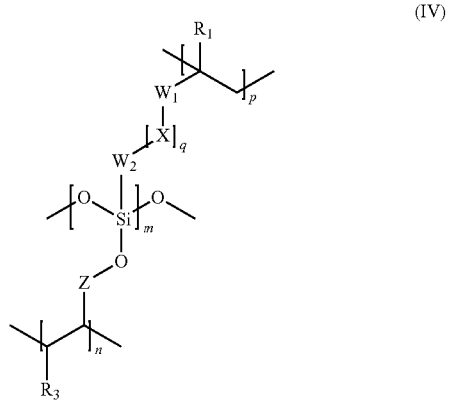

wherein:
W$_1$ and W$_2$, independently, are a bond, or an oxygen atom, a functionalized amine group, an unfunctionalized amine group, a functionalized amide group, an unfunctionalized amide group, a carbonyl group, a functionalized hydrocarbon, an unfunctionalized hydrocarbon, or any combination thereof;

X is a cationic group, or a hydrocarbon functionalized with a cationic group;

R$_1$ is hydrogen, or a hydrocarbon;

R$_3$ is a hydrogen, or a hydrocarbon;

the ratio of m:p:q is 0.1-1.5:0.8-1.2:0.8-1.2; and the ratio of m:n is from 1:2.3 to 1:4.

8. The self-supported ion exchange membrane according to claim 7, wherein the polymerized and crosslinked monomer chemically bonded to the polymer has a structure of formula (VII):

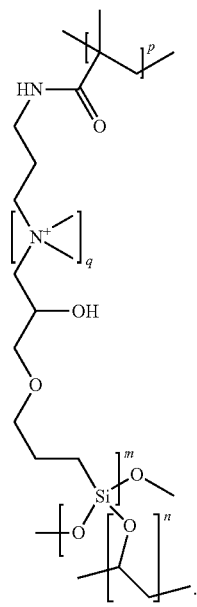

(VII)

9. A method for making a self-supported ion exchange membrane, the method comprising:
polymerizing a crosslinking monomer that includes: at least one cationic group, a polymerizable group, and a silicate forming group, to form a crosslinked polymer, wherein the polymerizing results in polymerization of the polymerizable groups and in formation of silicate from the silicate forming groups; and
reacting the crosslinked polymer with a reactive polymer that includes a plurality of silicate reactive groups that are reactive with the silicate group of the crosslinking monomer, wherein reacting the crosslinked polymer with the reactive polymer results in forming chemical bonds between the silicate and the silicate reactive groups.

10. The method according to claim 9, wherein the crosslinking monomer has a structure of formula (I):

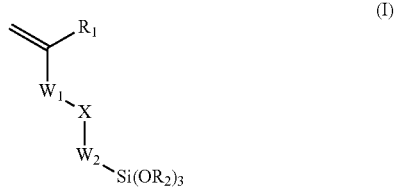

(I)

wherein:
W$_1$ and W$_2$, independently, are a bond, or an oxygen atom, a functionalized amine group, an unfunctionalized amine group, a functionalized amide group, an unfunctionalized amide group, a carbonyl group, a functionalized hydrocarbon, an unfunctionalized hydrocarbon, or any combination thereof;

X is a cationic group, or a hydrocarbon functionalized with a cationic group;

R$_1$ is hydrogen, or a hydrocarbon; and

R$_2$ is an alkyl group.

11. The method according to claim 9, wherein the reactive polymer that includes a plurality of silicate reactive groups has a structure of formula (II):

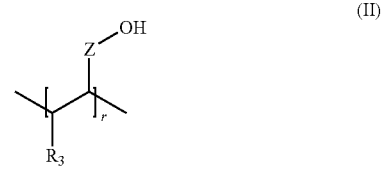

(II)

wherein:
R$_3$ is hydrogen, or a hydrocarbon;

Z is a bond or a hydrocarbon; and r is an integer from about 1800 to about 4500.

12. The method according to claim 9, wherein the crosslinking monomer is prepared by reacting, in the presence of an acid, a compound that includes an epoxide and the silicate forming group, with a compound that includes a tertiary amine and the polymerizable group.

13. The method according to claim 9, wherein the crosslinking monomer has a structure of formula (III):

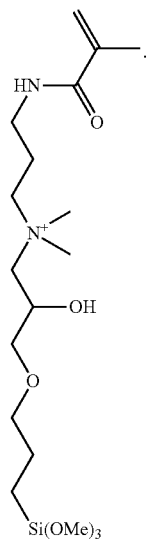
(III)

14. The method according to claim 9, wherein the reactive polymer is polyvinyl alcohol.

15. The method according to claim 9, wherein the crosslinked polymer and the reactive polymer are reacted in a molar ratio from about 1:2.3 to about 1:4 silicate forming groups:silicate reactive groups.

16. The method according to claim 9 wherein the polymerization is a radical polymerization, which is optionally catalyzed by the addition of a heat activated radical initiator.

17. The method according to claim 9, wherein the formation of silicate from the silicate forming groups is achieved by heating the crosslinked polymer to a temperature of between 60° C. and 150° C.

18. The method according to claim 9, further comprising casting the crosslinked polymer and the reactive polymer on a substrate before reacting the crosslinked polymer with a reactive polymer.

* * * * *